(12) United States Patent
Stach

(10) Patent No.: US 7,068,809 B2
(45) Date of Patent: Jun. 27, 2006

(54) SEGMENTATION IN DIGITAL WATERMARKING

(75) Inventor: John Stach, Tualatin, OR (US)

(73) Assignee: Digimarc Corporation, Beaverton, OR (US)

(*) Notice: Subject to any disclaimer, the term of this patent is extended or adjusted under 35 U.S.C. 154(b) by 867 days.

(21) Appl. No.: 09/940,872

(22) Filed: Aug. 27, 2001

(65) Prior Publication Data
US 2003/0039376 A1 Feb. 27, 2003

(51) Int. Cl.
*G06K 9/00* (2006.01)

(52) U.S. Cl. ............... 382/100; 382/173; 713/176; 380/54

(58) Field of Classification Search ........... 382/100, 382/173, 180; 380/54; 713/176
See application file for complete search history.

(56) References Cited

U.S. PATENT DOCUMENTS

| | | | |
|---|---|---|---|
| 5,987,459 A * | 11/1999 | Swanson et al. ............ 707/6 |
| 5,995,668 A * | 11/1999 | Corset et al. ............. 382/233 |
| 6,031,914 A * | 2/2000 | Tewfik et al. ............. 380/54 |
| 6,075,875 A * | 6/2000 | Gu ......................... 382/107 |
| 6,122,403 A | 9/2000 | Rhoads |
| 6,181,802 B1 | 1/2001 | Todd |
| 6,198,832 B1 | 3/2001 | Maes et al. |
| 6,268,866 B1 | 7/2001 | Shibata |
| 6,272,634 B1 * | 8/2001 | Tewfik et al. ............. 713/176 |
| 6,282,299 B1 * | 8/2001 | Tewfik et al. ............. 382/100 |
| 6,334,187 B1 | 12/2001 | Kadono |
| 6,400,831 B1 * | 6/2002 | Lee et al. ............... 382/103 |
| 6,411,725 B1 | 6/2002 | Rhoads |
| 6,614,914 B1 | 9/2003 | Rhoads et al. |
| 6,674,876 B1 | 1/2004 | Hannigan et al. |
| 2001/0016049 A1 | 8/2001 | Nguyen et al. |
| 2001/0052076 A1 | 12/2001 | Kadono |
| 2002/0009208 A1 | 1/2002 | Alattar et al. |
| 2002/0066019 A1 * | 5/2002 | Amonou et al. ........... 713/176 |
| 2003/0081836 A1 * | 5/2003 | Averbuch et al. .......... 382/199 |

FOREIGN PATENT DOCUMENTS

| | | |
|---|---|---|
| EP | 0966837 | 12/1999 |
| JP | 05-236424 | 9/1993 |
| WO | WO0249363 | 6/2002 |

OTHER PUBLICATIONS

Bender et al., "Techniques for Data Hiding," SPIE vol. 2420, Jan. 1995, pp. 164-173.

* cited by examiner

*Primary Examiner*—Barry Choobin
(74) *Attorney, Agent, or Firm*—Digimarc Corporation (57) ABSTRACT

Segmentation techniques are used in methods for embedding and detecting digital watermarks in multimedia signals, such as images, video and audio. A digital watermark embedder segments a media signal into arbitrary shaped regions based on a signal characteristic, such as a similarity measure, texture measure, shape measure or luminance or other color value extrema measure. The attributes of these regions are then used to adapt an auxiliary signal such that it is more effectively hidden in the media signal. In one example implementation, the segmentation process takes advantage of a human perceptibility model to group samples of a media signal into contiguous regions based on their similarities. Attributes of the region, such as its frequency characteristics, are then adapted to the frequency characteristics of a desired watermark signal. One embedding method adjusts a feature of the region to embed elements of an auxiliary signal, such as an error correction encoded message signal. The detecting method re-computes the segmentation, calculates the same features, and maps the feature values to symbols to reconstruct an estimate of the auxiliary signal. The auxiliary signal is then demodulated or decoded to recover the message using error correction decoding/demodulation operations.

44 Claims, 3 Drawing Sheets

SEGMENTATION IN DIGITAL WATERMARKING

TECHNICAL FIELD

The invention relates to steganography and data hiding.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 and U.S. Pat. No. 6,122,403, which are hereby incorporated by reference.

The invention relates to methods for embedding and detecting digital watermarks in multimedia signals, such as images, video and audio using segmentation techniques. One aspect of the invention is a method in which a media signal is segmented into arbitrary shaped regions based on a signal characteristic, such as a similarity measure, texture measure, shape measure or luminance or other color value extrema measure. The attributes of these regions are then used to adapt an auxiliary signal such that it is more effectively hidden in the media signal. In one example implementation, the segmentation process takes advantage of a human perceptibility model to group samples of a media signal into contiguous regions based on their similarities. Attributes of the region, such as its frequency characteristics, are then adapted to the frequency characteristics of a desired watermark signal.

Another aspect of the invention is a method for embedding and detecting digital watermarks in a media signal by segmenting the media signal into regions using a signal characteristic, such as a similarity measure, luminance extrema, texture, or shape. The embedding method adjusts a feature of the region to embed elements of an auxiliary signal, such as an error correction encoded message signal. The detecting method re-computes the segmentation, calculates the same features, and maps the feature values to symbols to reconstruct an estimate of the auxiliary signal. The auxiliary signal is then demodulated or decoded to recover the message using error correction decoding/demodulation operations.

Further features will become apparent with reference to the following detailed description and accompanying drawings.

DETAILED DESCRIPTION

The following disclosure details methods for embedding and detecting digital watermarks in multimedia works, such as images, audio and video. These methods take advantage of the perceptual attributes of the host media signal to hide auxiliary data in features of the host signal. Each of the techniques involve a segmentation of data representing the signal into regions based on the attributes of the data elements in those regions. The regions are then processed to embed and detect the auxiliary data. The techniques operate on a variety of data types and transform domain representations of the host media signal. The following discussion focuses on techniques involving segmentation of the spatial domain of images, although the technique is also applicable to other domains of images, such as a Fourier, wavelet, DCT or other transform domains. For imagery, spatial domain samples are important in terms of the impact of changes to embed the watermark on human perceptible artifacts, and in terms of the robustness of the watermark. In some applications, however, it is useful to transform pixels in a spatial domain representation into a transform domain, such as a Fourier transform domain, wavelet domain, or DCT domain to embed and/or detect digital watermark signals in those domains. As such, the following segmentation methods may be used for embedding and/or detecting operations by performing segmentation on image data in the transform domain. This is advantageous in certain image formats like MPEG, JPEG, and JPEG2000, where the image data is represented as quantized frequency domain coefficients. Similar principals can be applied to imagery in moving pictures (e.g., video). For audio, segmentation techniques can be applied to time domain samples, or transform domain data, such as time-frequency spectrograms of a music or voice clip.

Figure 1:
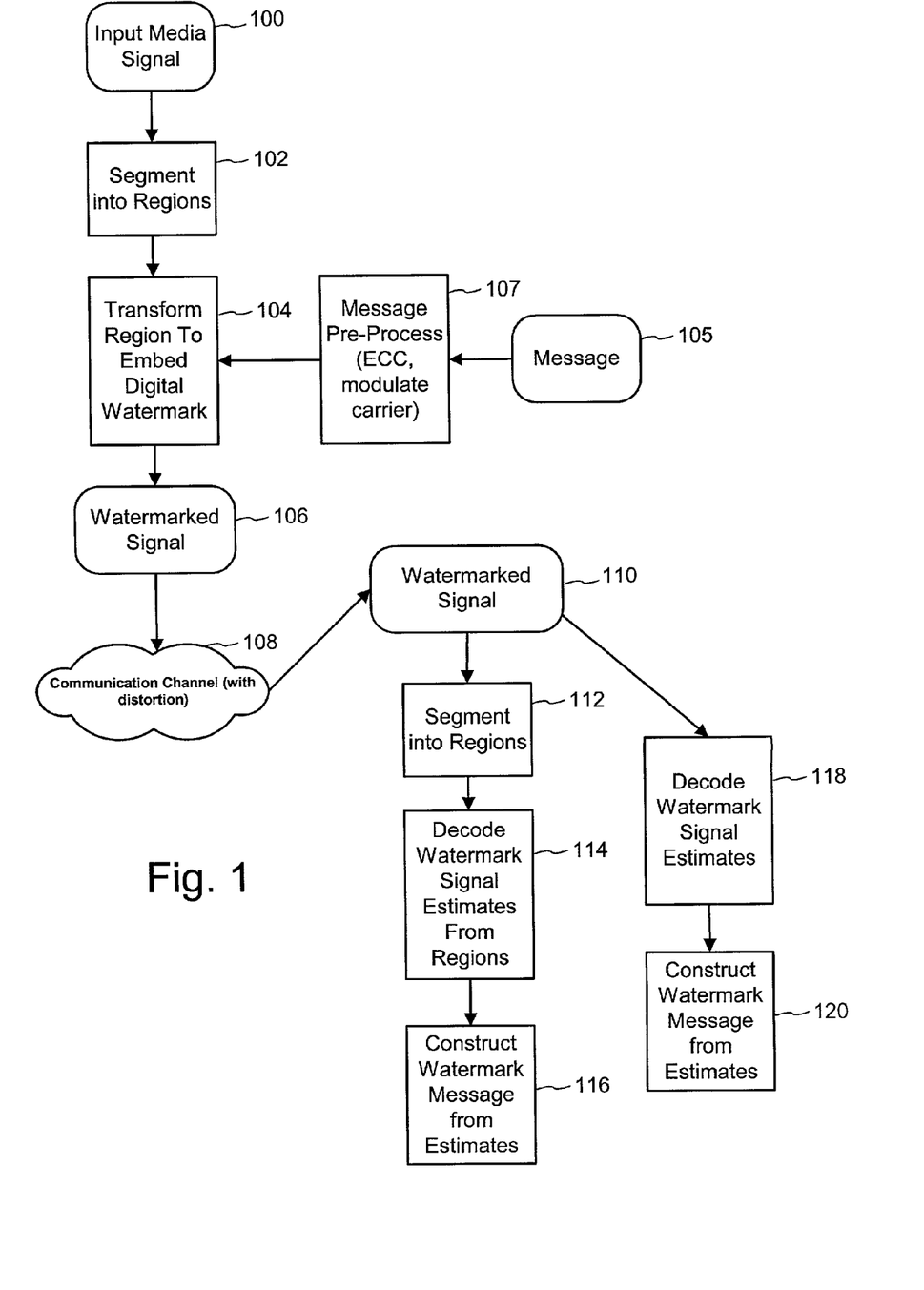
FIG. 1 is a diagram illustrating a digital watermark embedding and detecting process that uses segmentation.

FIG. 1 is a diagram illustrating a digital watermark embedding and detecting process that uses segmentation. This process applies to input multimedia signals 100 of different types, such as an image, moving images (sequence of video frames), and audio. For the sake of illustration, we will use a digital image comprised an N dimensional vector of image samples. Each image sample has one or more color values (e.g., luminance, RGB color triplet values, YUV, etc.) and two spatial coordinates (e.g., rectangular coordinates, or polar coordinates). A segmentation process 102 segments the input media signal into regions. For an image, the segmentation process uses an image characteristic, such as a similarity measure of a color attribute to group neighboring image samples in the spatial domain. One example of a suitable segmentation process is a watershed segmentation. See, for example Luc Vincent and Pierre Soille, "Watersheds in Digital Spaces: An efficient Algorithm Based on Immersion Simulations," IEEE Trans. PAMI, Vol 13 No 6, June 1991; and Kari Saarinen, "Watersheds in Color Image Segmentation," IEEE Workshop on Nonlinear Signal and Image Processing (NSIP), Halkidiki, Greece, June 1995, which are hereby incorporated by reference.

In our approach, segmentation includes two primary stages: 1) transform the input signal into a signal characteristic space, comprising an array of signal characteristic values computed from corresponding samples of the input signal; 2) group neighboring samples into regions based on the signal characteristics.

Segmentation methods fall into 3 categories, (1) characteristic feature thresholding or clustering, (2) edge detection, and (3) region extraction. See K. S. Fu and J. K. Mui, "A Survey on Image Segmentation," Pattern Recognition, Vol 13, pp3–16, 1981, which is hereby incorporated by reference. Also, within these methods, many techniques can be employed to compute the quantities used in the methods, e.g., statistics, edge filters, morphological filters, Markov random fields (MRF), fuzzy set theory, and neural nets. See Robert Haralick and Linda Shapiro, "Survey: Image Segmentation Techniques," Computer vision, graphics, and image processing, Vol 29, pp 100–132, 1985, which is hereby incorporated by reference. For our examples, we use the watershed algorithm which falls into the clustering segmentation category due to the inherent robustness we have seen with respect to typical noise and distortion processes for imagery. However, other segmentation methods could be employed for computational or robustness reasons with similar results. Furthermore, these segmentation techniques can be combined or layered for additional robustness in specific applications.

In our example of a spatial domain image, this process yields arbitrary shaped polygonal regions of image samples in the digital image. The regions are polygonal in a two-dimensional image space due to the fact that individual samples are located at discrete coordinates along rows and columns in the two dimensional space.

Another input to the system is a message 105 to be hidden in the input media signal 100. This message may be one or more M-ary or binary symbols, and may be represented by an N dimensional signal. In particular, a typical implementation pre-processes the message with error correction coding processes (BCH, convolution, repetition, turbo coding, etc.) and other forms of modulation to transform it into an intermediate signal in which the message is more robustly encoded (107). Further pre-processing includes spread spectrum modulating the message with a carrier signal, such as a pseudorandom signal generated by a cryptographic function seeded with a secret key number. The carrier may also be derived from and/or adapted to the input signal, such as using a hash of the host signal as a seed to a cryptographic function that generates the carrier signal, or some function of the input signal.

To embed the intermediate signal into the input signal, an embedding function 104 transforms the segments in a manner that modifies them slightly such that the modification is substantially imperceptible. Like the original input signal, each segment has multi-dimensions. In the example of an image, these dimensions are the spatial coordinates of the image samples in a region, as well as their color values. The embedding function transforms the regions according to corresponding elements of the intermediate signal.

One example embedding function is to modulate the region boundaries to encode elements of the intermediate signal, such as by replicating an edge pattern corresponding to elements of the intermediate signal. Another example is to modify the region by transforming into another form and adding that transformed region back to the original. Yet another example is to quantize the region to particular quantization bins that correspond to elements to be encoded. Preferably, instances of the message are repeated in spatial locations throughout the input media signal such that the entire message is automatically decodable from excerpts of the watermarked signal. In images, audio and video, the embedding scheme enables recovery from small excerpts by replicating the message in temporal and/or spatial sub-parts of the signal. Each instance of the message includes a fixed component used to detect the message and synchronize the message decoder, and a variable component to carry data that varies from one signal to the next, such as a usage control instruction, content identifier, transaction identifier, and index to a database.

The result of the embedding function is a watermarked media signal 106 in the same form as the input signal, but now carrying a hidden message. In many applications of digital watermarking, the watermarked signal is communicated through a communication channel that distorts the signal in some way, such as lossy distortion due to digital sampling and analog conversion, compression, broadcast, etc.

The segmentation-based approach to watermark embedding can provide a number of advantages. One advantage is the ability to hide the auxiliary data more effectively by adapting the watermark signal to the perceptual attributes of a region. Another advantage is the ability to make the watermark more robust to distortions. For example, the segments can be identified even after distortion, and thus, facilitate detecting the watermark and extracting the message carried within it.

FIG. 1 illustrates alternative approaches for watermark detection for digital watermarks embedded using segmentation techniques. In one approach (illustrated in blocks 112–116), the watermark detector segments the watermarked signal 110 in a manner similar to the embedder, and then extracts the watermark using the region information. In some applications, the segmentation process is primarily used to hide the watermark more effectively, and is not necessary to extract the information. In this case, the alternative approach shown in blocks 118–120 of FIG. 1 proceeds to decode the watermark signal without segmenting the watermarked signal.

In the first approach, the watermark detector segments the watermarked signal 110 (112) using the same criteria as in the embedder (102). Next, the watermark detector decodes watermark signal estimates from the segmented regions. To accomplish this step, the detector evaluates the attributes of the region and maps them to signal elements to reconstruct the intermediate signal. For example, if the intermediate signal is embedded in the region boundaries, the detector analyzes the boundary pattern and maps the pattern to estimates of the signal elements in the intermediate signal.

Next, the detector performs the inverse of the message pre-processing of block 107, such as demodulating estimates of the error correction encoded message from a carrier, and then performing error correction decoding on the message estimates. To facilitate detection, the message may include known or fixed symbols that are used to verify detection, eliminate false positives, and synchronize the message decoding function.

In the case where the segmentation is used primarily to adapt the watermark signal to the host signal, it is possible to detect the watermark signal by applying decoding operations to the watermarked signal without segmenting the watermarked signal. In this case, the watermark detector proceeds to evaluate the watermarked signal to derive estimates of the watermark signal (118), and then constructs a message from the estimates (120). In some applications where the mere presence of the watermark conveys information, such as a usage control flag, or message calibration or synchronization marker, the process of constructing a message from the estimates is unnecessary. Instead, detection block 118 determines whether the watermark signal is present using detection metrics, such as statistical indicators of an accurate detection (maximum likelihood indicator) or correlation thresholds.

Figure 2:
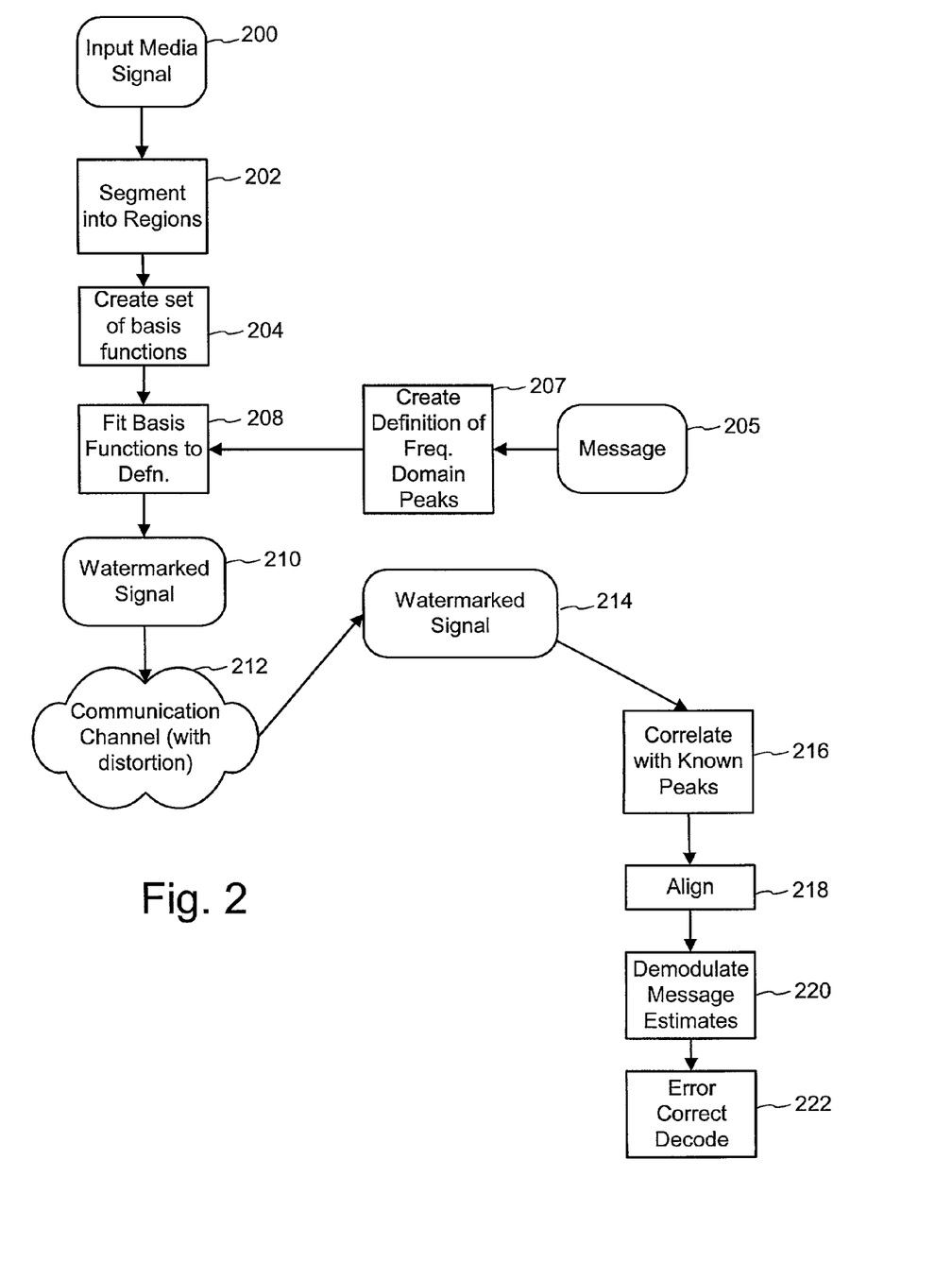
FIG. 2 provides an example of a digital watermark embedding and detecting process using segmentation to hide a watermark signal in a host image signal.

FIG. 2 provides an example of a digital watermark embedding and detecting process using segmentation to hide a watermark signal in a host image signal. In this application, the input signal is a digital image 200, but as noted previously, the technique is applicable to other media types. The input image comprises an array of pixels, each with spatial coordinates and color values. A segmentation process 202 segments the image into contiguous regions of pixels that satisfy a similarity constraint. In other words, to become a member of a region, a pixel must have an attribute, such as a color, that is within a pre-determined tolerance of all other like attributes of pixels in that region. Preferably, the similarity constraint is defined in terms of a Human Visibility System measure, where a human viewer would deem the pixels within the region to be similar.

The segmentation occurs in two or more stages: 1. Filter the input image (e.g., low pass filter, convert to luminance, etc.); 2. Map image samples to array of similarity characteristics such as local variance values or distance values ("distance" refers to the distance between a particular scalar or vector value such as a color triple, and another scalar or vector value); and 3. Group image samples into regions based on their similarity characteristics using a segmentation method like watershed.

Next, the embedder creates a set of frequency domain basis functions based on the segmented regions as shown in block 204. One example of such a set is the Fourier transform of each segmented region, zero padded to the size of a pre-determined image block size. Some variation over "flat" regions (e.g., those regions where the similarity attribute of each pixel is substantially the same) is acceptable. As such, it is appropriate to provide a multiple basis functions for such regions.

To illustrate in more detail, consider the following example of creating the basis functions:

1. Isolate each segmented region in the image (e.g., group of samples in a segmented region surrounded by zero valued pixels to fill up an image block (e.g., 256 by 256 or 128 by 128 block)
2. Perform frequency domain transform of samples in the block (e.g., FFT);
3. Repeat 1–2 for all segments; and
4. Form a matrix of the basis functions, A.

The embedder also defines the watermark signal as shown in blocks 205 and 207 of FIG. 2. The watermark signal definition may be fixed or partly fixed, with one or more variable components to enable the watermark to carry different message symbols forming a variable message (e.g., a message unique to the host signal, or some transaction, user, machine, etc.). In this example, the watermark signal comprises an array of impulse functions in a spatial frequency domain (e.g., the Fourier domain), each with particular location in the domain, as well as an amplitude and phase. This array can include fixed impulse functions, and variable ones (e.g., impulse functions that are either present or absent to encode binary symbols one or zero, respectively). These binary symbols may be generated in a pre-processing phase using error correction coding, spread spectrum modulation, etc. as described above. Preferably, the phases of the respective impulse functions are pseudo-random (e.g., specified by a secret key used for watermark detection). Using a pseudo-random phase specification makes the watermark substantially imperceptible in the host signal.

To embed the resulting watermark signal definition, the embedder fits the basis functions calculated in block 204 to the watermark definition created in block 207. One example of such a fitting process is a least square fit of the allowable basis functions to the impulse functions in the watermark definition (208). This approach adjusts the luminance (or other color values) of the segmented regions in the image to match the desired frequency domain characteristics of the watermark definition.

To illustrate in more detail, consider the following example of fitting the basis functions to the watermark definition:

1. Form a matrix representing the desired watermark definition, b.
2. Using a least squares technique, solve for weighting matrix, x, in the expression Ax=b, within a desired tolerance.
3. Enable sub-segmentation to enable solution to converge.

To illustrate in more detail, consider the following example of fitting the basis functions to the watermark definition:

1. Form the basis function, A, as described above. The columns of this matrix represent the values of each location in the transform (e.g., frequency) domain. Since the basis functions are based on the Fourier transform of regions which are typically small, each basis functions will extend over much of the frequency domain so that there is significant overlap of basis functions in the regions where we want to control the frequency domain response, e.g, peaks.
2. Determine constraints on the allowable variations for each basis function. Typically, this constraint is a total energy constraint on the weights to limit the visibility of the changes in the image. However, more complex constraints can be applied to take into account local characteristics of each basis function with respect to visibility such as luminance, edges, texture, variance, etc.
3. Determine the desired pattern to fit in the transform (e.g., frequency) domain based on the characteristics of the watermark embedder and reader. For our example, we use peaks in the frequency domain which are later used to facilitate alignment of the watermark and to embed data if desired.
4. Perform an optimization of the basis function weights to maximize the fit to a desired frequency domain pattern (e.g., peaks) within the constraints determined in (2). The optimization process includes an objective function and an approach. In our example, we will minimize the squared residual between the desired pattern and the sum of the weighted basis functions such that we do not exceed the visibility constraints determined in (2). This is commonly called a constrained least squares (LS) optimization. Given that A is matrix of basis functions and b is a vector of the desired transform domain values, the LS solution with a basic energy constraint is given by;

a. Find the minimum of $\|A\Delta x - b\|^2$ subject to $\|\Delta x\|^2 < C$ where $\Delta x$ is the vector of weights that describe the change from unity for each basis function, and C is the allowable energy in x. Note that if $\Delta x$ is zero, then the basis functions are not changed and the image is unmarked.

b. The solution for 4a is $\Delta x=(A^H A+\lambda I)^{-1} A^H b$, where $\lambda$ is an energy constraint, I is the identity matrix, and superscript H indicates conjugate transpose.

5. Reconstruct the image with new basis function weights as modified by the solution in (4).

This process yields a weighting matrix x that is applied to the image. Preferably, the technique is applied to image blocks, such as 128 by 128 blocks. As such, a preliminary processing stage sub-divides the image into these blocks and invokes the process described above on each block.

Since the Fourier transform is a linear operation, adjustments to pixels in the region may be made in the frequency or spatial domain. For example, the embedder can adjust the frequency domain representation of the host signal according to the watermark definition to form a frequency domain representation of the watermarked signal region, and then take the inverse Fourier transform of the watermarked regions to produce the watermarked signal in the spatial domain. Alternatively, the embedder can compute a difference signal to effect the desired changes to the region in the frequency domain, and then compute the inverse transform of the difference signal into the spatial domain, where corresponding pixels of the difference signal and host signal region are summed. Either way, the result is a watermarked signal in the original domain of the host signal (210).

As with the process illustrated in FIG. 1, it is expected that the watermarked signal will be passed through some form of communication channel 212 that includes distortion. For image, this may include printing and scanning, re-sampling, compression, geometric distortion, additive noise, quantization, etc. The detector process (216–222) receives a suspect signal, which may or may not be watermarked (214), and must detect the watermark.

In this particular implementation, the frequency domain watermark definition is replicated throughout the segmented regions of the image. As such, the task of the detector is to detect the expected frequency domain characteristics, and in some applications, use these characteristics to compute the geometric distortion to the image since embedding, align the image, and decode a message payload carried in the watermark. Techniques for detecting frequency domain impulse functions or peaks, as well as computing rotation, scale and translation of the image since embedding, are described in patent application Ser. No. 09/503,881 and U.S. Pat. No. 6,122,403, incorporated above.

FIG. 2 illustrates a detection process that detects and reads the watermark payload without use of the original, unmarked signal. The first stage of detection is to correlate the suspect image representation with a known peak definition (216). First, the detector transforms the suspect signal into the color space in which the watermark was embedded (e.g., luminance channel). It then performs pre-filtering operations to reduce the interference between the host signal and the watermark signal (e.g., convolves a non-linear filter kernel with the suspect image). Next, it correlates the suspect signal with a watermark definition of known peak magnitudes in the Fourier magnitude domain to recover rotation and scale parameters. Preferably, correlation operators such as generalized match filtering or impulse match filtering are executed in a log polar mapped space of the Fourier magnitude domain so that the scale and rotation distortion are converted to translation distortion in the log polar space. This enables efficient use of match filtering operations to identify correlation peaks corresponding to rotation and scale parameter estimates.

In the case where certain frequency domain impulses are selectively turned on or off to encode payload information, the known peak definition should include the use of either fixed peaks that are always present at known spatial frequency locations for a particular watermark protocol, and/or a minimum number of the peaks from among a set of known spatial frequency locations should always be present (e.g., half the peaks), even if the peaks selected to be present vary in location from one message to another. The latter attribute can be achieved by modulating the message with a carrier that yields an intermediate signal with roughly the same numbers of one and zero elements corresponding to the presence and absence of certain peaks at known spatial frequency locations.

Once the detector has determined rotation and scale based on correlating the suspect image data with the expected peak magnitude and location definition, the detector proceeds to use the peak phase specification of the detected peaks to determine translation (x, y shift of the image since embedding). This can be accomplished through correlation in the Fourier phase domain or spatial domain.

Once the geometric distortion parameters are determined, the detector aligns the suspect image data using the geometric parameters to reverse the distortion as shown in block 218. In particular, the image data is rotated, scaled and translated to approximate its original state at the time of embedding.

At this point, the detector demodulates the message from detected peaks (220). First, peaks are detected in the aligned image data. Next, the presence or absence of peaks at specified locations in the spatial frequency domain are mapped to message estimates of ones and zeros. These estimates may be weighted for soft bit decoding based on the confidence level of the peak detection. Next, the detector performs error correction decoding (222) such as Viterbi decoding of a convolution code to recover an error corrected message.

Figure 3:
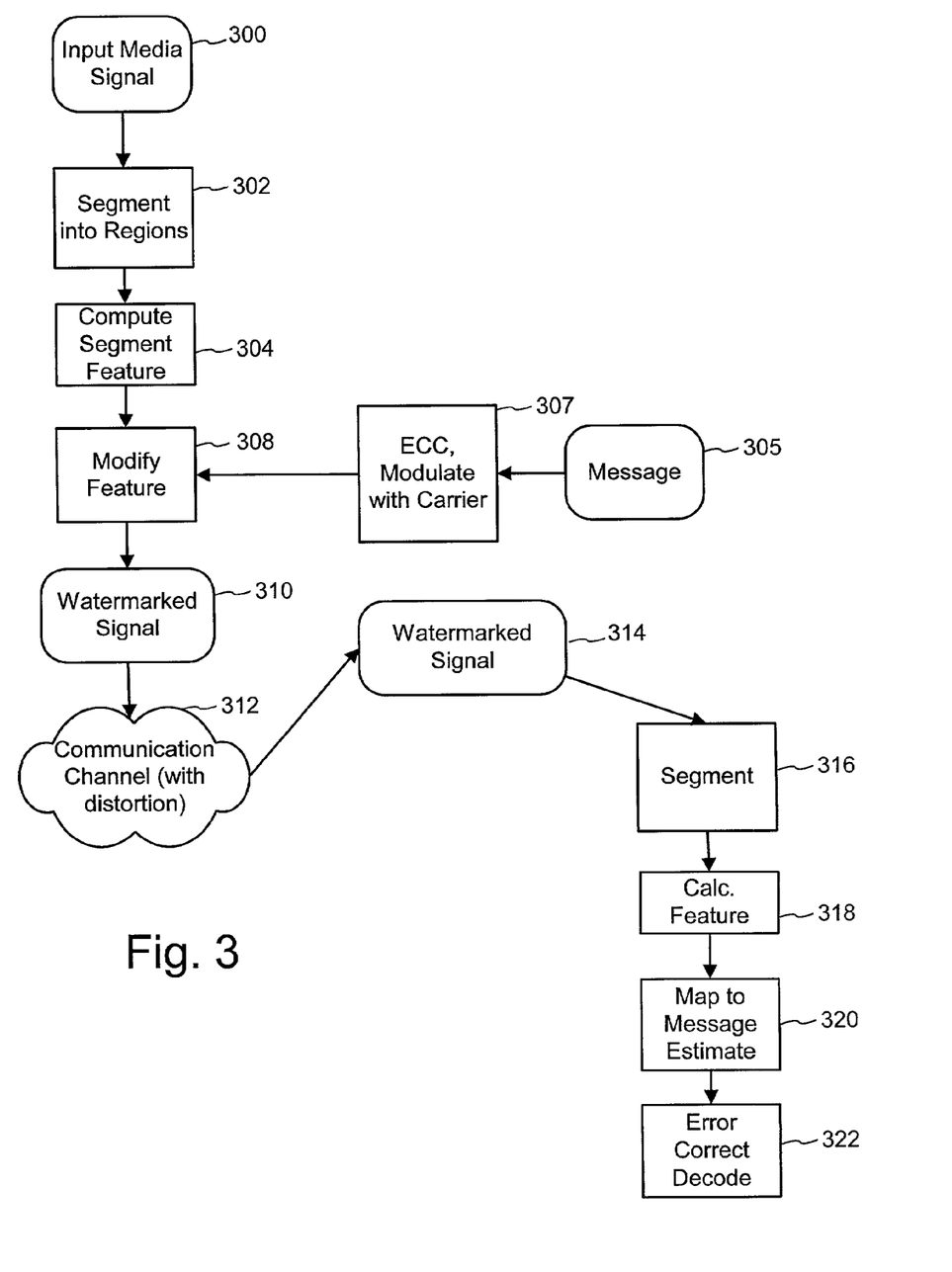
FIG. 3 is a diagram illustrating another digital watermark embedding and detecting process that uses segmentation.

FIG. 3 is a diagram illustrating another digital watermark embedding and detecting process that uses segmentation. As with the previous example, we will illustrate this process with an implementation designed to hide auxiliary data an image (e.g., a digital watermark). A similar process can be applied to segmented video, such as MPEG 4 video objects. In addition, a similar process may be used on segmented audio, such as segmented time-frequency spectrogram. The spectrogram comprises a time frequency representation of an audio signal with a time axis representing the time varying nature of an audio signal, and a log frequency (Bark scale) or frequency axis representing the frequency content of the signal at a particular time window.

The input media signal 300 to this example embedding process is a digital image comprising spatial domain image samples having spatial coordinates and color values (e.g., RGB, luminance, chrominance, etc.). A segmentation process segments the image into regions based on a signal characteristic such as luminance, a similarity measure, texture measure, a shape, etc. as described above with reference to FIG. 1. The segmentation produces sets of contiguous pixels in the spatial domain, which are arbitrary, polygonal shaped regions.

The process of embedding operates by setting an attribute or attributes of the segment to a particular value corresponding to elements of an auxiliary signal. The embedding process makes the adjustment to the region in a manner that exploits the data hiding capability of the region. In particular, the region is minimally adjusted to map the attribute to a value corresponding to an element of the auxiliary signal, yet still achieve desired robustness constraints. The following section provides several alternative examples of embedding methods and corresponding detection that enable message to be hidden, yet detected automatically without the original, un-marked signal.

The embedding process computes a feature of the region (e.g., its shape, edge characteristics, etc.) as shown in block 304 and then modifies that feature to embed elements of an intermediate signal as shown in block 308.

The intermediate signal carries a message (305) to be hidden in the host signal. It is formed by error correction encoding a binary message string, which includes fixed binary symbols and variable symbols. Examples of error correction codes include BCH, convolution codes, and turbo codes. Further processing may be used, such as spread spectrum modulation of the message with a pseudo-random number sequence.

An embedding map translates the elements in the intermediate signal into changes in selected features of the regions. For example, an intermediate signal value of a one maps to one set of feature changes, while an intermediate signal value of zero maps to separate and distinct feature changes. The intermediate signal may alternatively be comprised of M-ary symbols, each with corresponding sets of distinct feature changes.

One type of feature change is to impose a boundary pattern on a region that corresponds to a desired symbol to be encoded.

Another type of feature change is to transform the shape of the region such that the shape corresponds to a desired symbol to be encoded.

Another type of feature change is to alter one feature in a region so that it has a predetermined relationship with another feature in the region that corresponds to a symbol to be encoded. For example, the relative positions of boundary pixels can be changed relative to each other such that the relative position corresponds to a symbol to be encoded.

A variation of this approach is to transform a feature of a region, such as its shape, to create a transformed region, which is then added back to the original region. This allows at least two different forms of embedding symbols:
1. a symbol based on the relationship of the original region and the transformed region;
2. a symbol based on a feature of the region, which is set by adding a transformed region so that the new region has a feature corresponding to the embedded symbol.

For example, a first transform may be used to embed one symbol, and another transform to embed a second symbol. The embedder selects the transform based on the symbol to be encoded, transforms the region (e.g., the shape of the region), and then adds the transformed region to the original region.

Alternatively, the symbol may correspond to a feature of the new region after transforming the original region and adding the transformed region to the original region. In this case, the embedder computes the feature of the original region, and then determines the transform that should be applied to the original region such that when the transformed region is added to the original region, the feature of the new region will correspond to the desired symbol to be encoded.

The output of the process is a watermarked signal 310. As in previous examples, the watermarked signal undergoes distortion through a communication channel (like printing and re-scanning, broadcast, re-sampling, etc.). This results in a potentially distorted version of the watermarked signal 314.

The detector begins by segmenting the watermarked signal using the same process as the embedder as shown in block 316. Next, it calculates the value of the feature or features within each region used to encode symbols of the intermediate signal. These features are mapped to symbol estimates by finding the symbol that matches the features calculated in the regions (320). Next, the detector performs error correction decoding to reconstruct the embedded message (322).

As noted previously, the segmentation process may be performed on a variety of signal characteristics, such as luminance (for images), similarity, texture, and shape, to name a few. To segment based on luminance magnitude values, the segmentation process maps the color image into luminance values, and optionally low pass filters the luminance values. Neighboring pixels falling in pre-determined luminance ranges are grouped together.

To segment based on similarity, the segmentation process maps image samples to an array of corresponding similarity values based on similarity characteristics, such as local variance or distance between neighboring sample color values (e.g., neighboring luminance values).

To segment based on texture, the segmentation process maps image samples to an array of corresponding texture characteristics, such as variance, edge detection, Markov random fields or features derived from values in a co-occurrence matrix of the image. A cooccurence matrix is a histogram of the number of times a pair of pixel intensity values occur with a specific spatial relationship. It is always square since each dimension of the matrix is indexed by the number of quantization levels for the image (which is usually small, e.g., 8 bits, to reduce computational complexity). The coocurence matrix can be invariant to certain distortions by summing related spatial positions, e.g., rotational invariance can be employed by summing the coocurrences of a pixel with all neighbors. There are many texture features that can be derived from a cooccurance matrix such as energy, entropy, correlation, etc. See, for example, R. W. Conners, M. M. Trivedi, and C. A. Harlow, "Segmentation of High-Resolution Urban Scene using Texture Operators," Computer Vision, Graphics and Image Processing, vol 25, pp 273–310, 1984, which is hereby incorporated by reference.

To segment based on shape, the segmentation process maps image samples to an array of corresponding shape characteristics, such a generalized Hough transform.

The segmentation process then groups image samples together using a technique like a watershed method on the signal characteristics.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of embedding a digital watermark into a media signal comprising:
   segmenting the media signal into arbitrary shaped regions according to at least one signal characteristic of the media signal;
   evaluating a feature of the regions; and
   modifying the feature to embed hidden auxiliary data in the media signal.

2. The method of claim 1 wherein the characteristic comprises a similarity measure.

3. The method of claim 1 wherein the characteristic comprises a texture measure.

4. The method of claim 1 wherein the characteristic comprises a color extrema measure.

5. The method of claim 4 wherein the color extrama comprises luminance extrema.

6. The method of claim 1 wherein the characteristic comprises a shape measure.

7. The method of claim 1 wherein the segmentation comprises a watershed segmentation of the at least one signal characteristic.

8. The method of claim 1 wherein the feature comprises a frequency domain transform of a region.

9. The method of claim 8 wherein modifying comprises modifying the frequency domain transform according to a digital watermark signal definition.

10. The method of claim 1 wherein modifying comprises setting an attribute of a region to a value corresponding to an element of the auxiliary data.

11. The method of claim 10 wherein the auxiliary data comprises an intermediate signal formed from a multi-bit message.

12. The method of claim 11 wherein forming the intermediate signal comprises spread spectrum modulating the multi-bit message.

13. The method of claim 11 wherein forming the intermediate signal comprises error correction encoding the multi-bit message.

14. The method of claim 1 wherein modifying comprises modifying shape of a region to correspond to auxiliary data to be embedded.

15. The method of claim 1 wherein modifying comprises modifying a feature in a region so that the modified feature has a predetermined relationship with another feature in the region, where the predetermined relationship correspond to a symbol to be embedded.

16. The method of claim 15 wherein relative positions of boundary pixels are changed to embed the symbol.

17. The method of claim 1 wherein modifying comprises transforming a feature of a region to created a transformed region, and adding the transformed feature to the region.

18. The method of claim 17 wherein a symbol in the auxiliary data is embedded by establishing a predetermined relationship between the transformed region and the region.

19. The method of claim 17 wherein a symbol in the auxiliary data is embedded by adding the transformed region to the region to form a new region with a feature that corresponds to the symbol.

20. The method of claim 17 wherein a first transform is used to embed a first symbol; and a second transform is used to embed a second symbol.

21. A computer readable medium on which is stored instructions for performing the method of claim 1.

22. A computer readable medium on which is stored an electronic media signal embedded with a digital watermark using the method of claim 1.

23. A physical object bearing an image which is embedded with a digital watermark using the method of claim 1.

24. A method of reading a digital watermark that has been embedded in a media signal so as to be substantially imperceptible in the media signal, the method comprising:
   segmenting the media signal into arbitrary shaped regions based on at least one signal characteristic of the media signal;
   evaluating a feature of the regions; and
   computing message symbols from the evaluated features of the regions.

25. The method of claim 24 wherein the characteristic comprises a similarity measure.

26. The method of claim 24 wherein the characteristic comprises a texture measure.

27. The method of claim 24 wherein the characteristic comprises a color extrema measure.

28. The method of claim 27 wherein the color extrama comprises luminance extrema.

29. The method of claim 24 wherein the characteristic comprises a shape measure.

30. The method of claim 24 wherein the segmentation comprises a watershed segmentation of the at least one signal characteristic.

31. The method of claim 24 wherein the feature comprises a frequency domain transform of a region.

32. The method of claim 24 wherein computing message symbols comprises estimating message symbols by computing a relationship between the feature and another feature in the region; and assigning a symbol value based on the relationship, where the symbol value is selected from predetermined symbol values, each being associated with a predetermined feature relationship.

33. The method of claim 24 wherein computing message symbols comprises estimating message symbols by matching the feature with predetermined feature values, each predetermined feature value being associated with a predetermined symbol.

34. The method of claim 24 wherein computing message symbols comprises estimating message symbols from patterns of boundary pixels of the regions, wherein message symbols correspond to predetermined boundary patterns.

35. The method of claim 24 wherein computing the message symbols comprises estimating message symbols from shapes of the regions, wherein message symbols correspond to predetermined region shapes.

36. The method of claim 24 wherein computing the message symbols comprises estimating message symbols by mapping a value of the feature to one of a set of quantization bins, where the quantization bins are associated with predetermined message symbols.

37. The method of claim 33 including:
   spread spectrum demodulating the estimated message symbols to produce a spread spectrum demodulated message signal.

38. The method of claim 37 including error correction decoding the spread spectrum demodulated message signal.

39. The method of claim 33 including error correction decoding the estimated message symbols to produce an error corrected message.

40. A computer readable medium on which is stored software for performing the method of claim 24.

41. A method of embedding a digital watermark into a media signal comprising:

segmenting the media signal into arbitrary shaped regions according to at least one signal characteristic of the media signal;

transforming media signal samples in the regions from one domain to another;

adapting the transformed samples in the regions according to a digital watermark definition to embed hidden auxiliary data in the media signal.

42. A computer readable medium on which is stored software for performing the method of claim 41.

43. A computer readable medium on which is stored an electronic media signal embedded with a digital watermark using the method of claim 41.

44. A physical object bearing an image which is embedded with a digital watermark using the method of claim 41.

* * * * *